United States Patent [19]

Täuber

[11] 4,240,035
[45] Dec. 16, 1980

[54] DIGITAL DEMODULATOR ON A SEMICONDUCTOR BASE

[75] Inventor: Reinhard Täuber, Germering, Fed. Rep. of Germany

[73] Assignee: Siemens Aktiengesellschaft, Berlin & Munich, Fed. Rep. of Germany

[21] Appl. No.: 19,137

[22] Filed: Mar. 9, 1979

[30] Foreign Application Priority Data

Mar. 17, 1978 [DE] Fed. Rep. of Germany ....... 2811753

[51] Int. Cl.³ ............................................. H03K 13/01
[52] U.S. Cl. ...................... 329/50; 329/104; 375/94
[58] Field of Search ............... 329/50, 102, 104, 106, 329/107, 122; 375/25, 94

[56] References Cited

U.S. PATENT DOCUMENTS

| | | | |
|---|---|---|---|
| 3,737,895 | 6/1973 | Cupp et al. | 329/104 X |
| 3,982,195 | 9/1976 | Turner | 329/50 |
| 4,153,814 | 5/1979 | Burgert | 375/25 |

OTHER PUBLICATIONS

Schulenburg, "Einfache Fernsteuerung für 9 Kanäle", Elektronik, 1975, vol. 10, pp. 104, 105.

Primary Examiner—Siegfried H. Grimm
Attorney, Agent, or Firm—Hill, Van Santen, Steadman, Chiara & Simpson

[57] ABSTRACT

A demodulator is disclosed in which the input for a digital signal to be demodulated is connected to at least two consecutive, pulse-controlled, bistable flip-flops. An auxiliary signal, produced with the aid of an oscillator and corresponding with the carrier frequency on which the signal to be demodulated is based, is connected to a receiver side via a first input of a NAND-gate and is connected to a pulse input of a first flip-flop cell via this NAND-gate. An output of the first flip-flop cell corresponding with this pulse input is not only connected to the one input of a second NAND-gate but also to the pulse input of a second flip-flop cell and whose Q-output is connected to the second input of the second NAND-gate. The Q-output of the second flip-flop cell is used as a signal output of the demodulator. Finally, the signal to be demodulated is simultaneously connected to the reset inputs of the two flip-flop cells.

7 Claims, 3 Drawing Figures

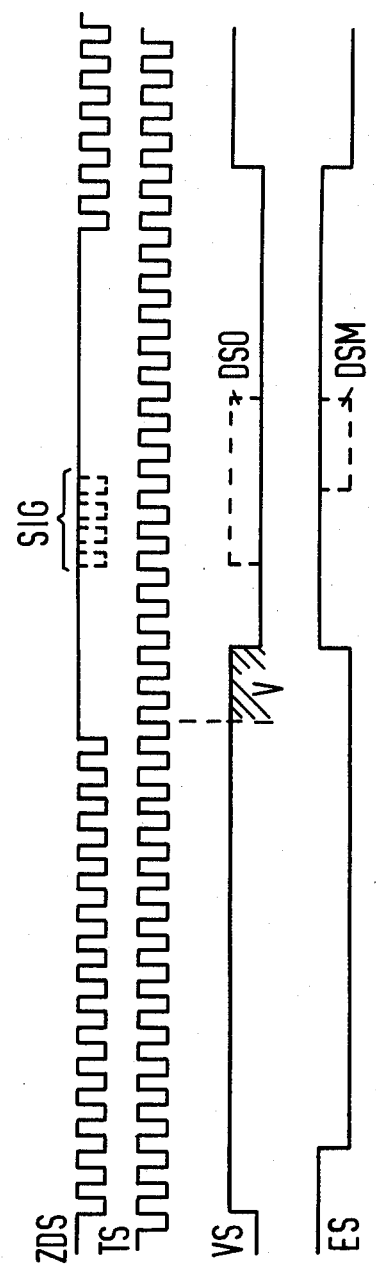

DIGITAL DEMODULATOR ON A SEMICONDUCTOR BASE

BACKGROUND OF THE INVENTION

The invention relates to a digital demodulator on a semiconductor base in which the input for the signal to be demodulated is connected to at least two consecutive pulse-controlled bistable flip-flops.

Such a demodulator is described in the publication "Elektronik", 1975, Vol. 10, p. 104/105, incorporated herein by reference. A decade counter with decoded outputs is provided in this demodulator, said counter being available in the form of an integrated semiconductor module (CD 4017 AE). The input for the signal to be demodulated is connected to the reset input 15 of this module via the parallel circuit of a diode having an ohmic resistance—which forms the actual demodulator—said module being simultaneously connected to ground via a capacitance. The pulse for the operation of the module is simultaneously supplied by the input of the signal to be demodulated and is connected at its input referenced 14. The decoded and demodulated impulses appear at the outputs of the module.

Such demodulators characterized by an externally series-connected diode and RC combinations, however, have the following disadvantages:
 (a) they cannot be completely integrated into MOS circuits;
 (b) they lead to time-dependent discharge and charge curves which is due to the time constant of the external RC element;
 (c) they lead to distortions of the demodulated signal on the basis of the discharge time constant;
 (d) a strong influence upon the threshold values takes place by means of the preamplifier when weak input signals are present;
 (e) signal breakdowns can mutilate the code; and
 (f) the dimensioning of the derivative capacitance and of the ohmic resistance of the known demodulators is necessarily a compromise between the integration time constant, which is to be large in view of malfunctions, and the discharge time which is to be small for small impulse distortions.

SUMMARY OF THE INVENTION

It is an object of the invention to provide means which permit doing without the diode-RC combinations provided in the known digital demodulators and to thus provide the possibility of removing disadvantages connected with diode-RC combinations.

According to the invention, a digital demodulator of the initially defined type is suggested which is characterized in that a signal produced with the aid of an oscillator and an auxiliary signal corresponding with the carrier frequency of the signal to be demodulated is connected to the pulse input of a first bistable flip-flop on the receiver side via the first logic input of a negated first AND-gate, and the respective pulse output is not only connected to the one logic input of a second negated AND-gate but also to the pulse input of a second bistable flip-flop. Additionally the Q-output of the second bistable flip-flop is connected to the second logic input of the second negated AND-gate, and its logic output is connected to the second logic input of the first negated AND-gate. A demodulated signal can be taken at a Q-output of the second bistable flip-flop and the signal to be demodulated is simultaneously conveyed to the reset inputs of the two bistable flip-flops via an inverter, if necessary.

In an important further development of this demodulator the Q-output of the second bistable flip-flop conveying the demodulated signal is connected to the reset inputs of two additional bistable flip-flops. Also, the signal input for the signal to be demodulated is connected to the one logic input of a third negated AND-gate and its output is connected to a pulse input of a third bistable flip-flop. The Q-output of the third bistable flip-flop is not only connected to the first logic input of a fourth negated AND-gate but also to the pulse input of a fourth bistable flip-flop. The second logic input of the fourth negated AND-gate is loaded by the Q-output of the fourth bistable flip-flop and its logic output is connected to the second logic input of the third negated AND-gate. Finally, a Q-output of the fourth bistable flip-flop is provided as an output for the demodulated signal.

This further development of the invention obviously provides two demodulators. These demodulators are synchronously pulsed relative to one another and the output signal of the first demodulator is conveyed to the respective inputs, that is, to the reset inputs of the bistable flip-flops of the second demodulator.

BRIEF DESCRIPTION OF THE DRAWINGS

FIG. 3 shows an impulse scheme of the arrangement according to FIG. 2.

DESCRIPTION OF THE PREFERRED EMBODIMENTS

Figure 1:
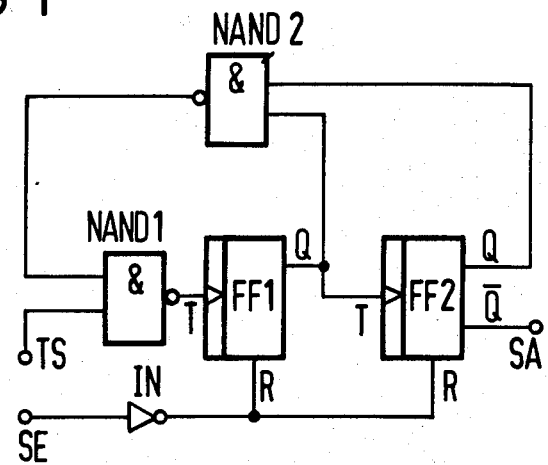
FIG. 1 illustrates a logic circuit diagram of a basic embodiment of the invention.

The arrangement according to FIG. 1 will first be described. The input SE for the signal to be demodulated is connected via an inverter IN to the two reset inputs of the two digital divider stages FF1 and FF2 which can be designed, for example, as dynamic J-K flip-flop cells. If such flip-flop cells are used, the J-input and the K-input of the individual cells remains unconnected, whereas the inverter IN is connected to the reset inputs of the two flip-flop cells.

The pulse input T of the first flip-flop cell FF1 is connected to the logic output of a first negated AND-gate NAND1, whose one logic input (the NAND gates utilized respectively exhibit only two logic inputs) is loaded by the auxiliary signal TS. The second logic input of this first negated AND-gate NAND1 is connected to the output of a second negated AND-gate NAND2.

The auxiliary signal TS corresponds with regard to its frequency and its chronological flow at least approximately with the carrier frequency utilized for the signal to be demodulated at the transmitter side, said carrier frequency which, for example, can have a sine-shaped or rectangular course. Said carrier frequency is produced with the aid of a conventionally designed oscillator—not illustrated in the Figures—and connected to the inputs referenced TS in the Figures.

The first logic input of the second negated AND-gate NAND2 is loaded by the one output Q of the first flip-flop cell FF1, said output Q being simultaneously connected to the pulse input T of the second flip-flop cell FF2. The reset inputs of the flip-flop cells used are referenced "R". The Q-output of the two outputs of the second flip-flop cell FF2 is connected to the second logic input of the second negated AND-gate NAND2, whereas the Q-output (or also the Q-output) conveys the demodulated signal which reaches the signal output of the demodulator according to FIG. 1 and can there be tapped.

Figure 2:
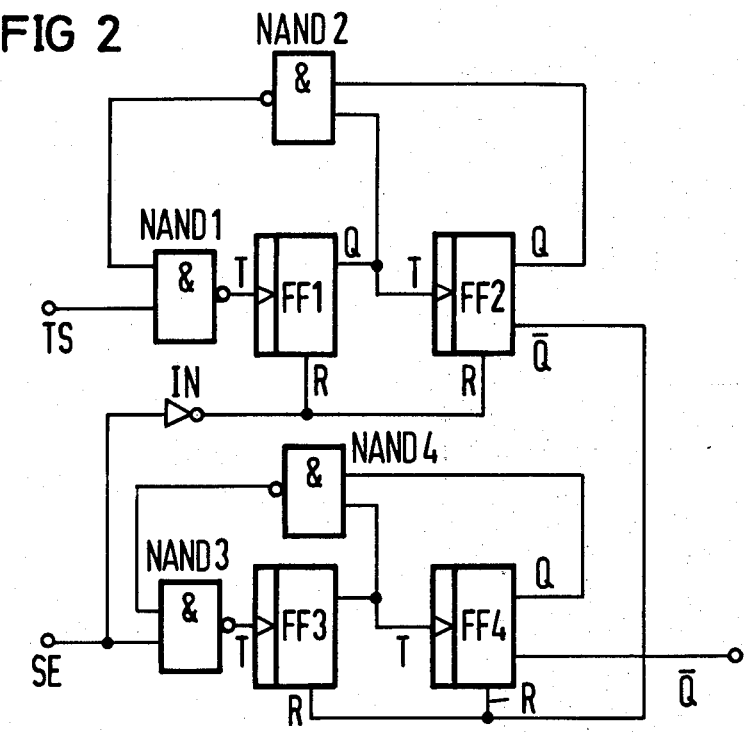
FIG. 2 illustrates a logic circuit diagram of an improved form of a digital demodulator in accordance with the invention.

The circuit of the demodulator described is also used in the arrangement illustrated in FIG. 2. There, however, two additional flip-flop cells FF3 and FF4 are present which correspond with the design of the flip-flop cells FF1 and FF2. There, two reset inputs R are loaded by the demodulated signal which is supplied by the flip-flop cell FF2, whereas the pulse input T of the third flip-flop cell FF3 is connected to the logic output of a third negated logic AND-gate NAND3. The Q-output of the third flip-flop cell FF3 is connected to the pulse input of the fourth flip-flop cell FF4 and additionally to the one logic input of a fourth negated AND-gate NAND4 whose second logic input is occupied by the Q-output of the fourth flip-flop cell FF4. The Q-output of the fourth flip-flop cell FF4 in the sample case forms the output of the demodulator which conveys the improved demodulated signal.

The one logic input of the third negated AND-gate NAND3 is supplied by the output of the fourth logic NAND-gate NAND4, whereas the other logic input of the third NAND-gate NAND3 is connected to the signal input SE for the signal to be demodulated. The output signal supplied by the fourth flip-flop cell goes to a digital receiver.

The digital demodulators previously described are primarily intended for PCM signals (i.e. pulse-code-modulated signals) as they are transmitted in remote control equipment by the transmitter (modulator) in wireless fashion (for example, by infrared radiation, ultrasonics, optically or also by means of high frequency) to a receiver (demodulator). In addition to an interference blanking for individual or several interference impulses (up to three interference impulses are directly suppressed) the demodulated signal is only slightly distorted in the circuit illustrated in FIG. 2. The obtained improvements, for example, in PCM signals, is to the full advantage of the input amplifier which supplies the signal to be demodulated, since the influence of the transient and decary behavior of this amplifier—naturally provided with a control—becomes non-critical for the signal.

The previously mentioned advantages are primarily obtained in the embodiment illustrated in FIG. 2 which illustrates a corresponding connection of two demodulators which are similar in principle, whose principle conditioned distortions run counter to three clock pulse periods of the reference frequency TS, namely the auxiliary signal, and thus cancel out up to a possible remainder of a maximum of a half a pulse period of the reference frequency TS. This is shown with the aid of the impulse diagram in FIG. 3.

Primarily the embodiment illustrated in FIG. 2 suppresses narrow interfering pulses and interfering impulse groups up to three impulses. A demodulator designed as such also increases the safeguard against interference of the system connected at the outlet side of the demodulator vis-a-vis the arrangement illustrated in FIG. 1, and even moreso vis-a-vis the known arrangements, as results directly from FIG. 3.

An impulse with a duration of three periods of the reference frequency, thus of the auxiliary signal, is produced from a fourth interfering impulse. During transmission pauses the second demodulator formed by the flip-flop cells FF3 and FF4 are constantly reset by the output signal of the first demodulator formed by the cells FF1 and FF2. Again the next three interfering impulses are suppressed with this reset since the second demodulator first requires three input impulses prior to the formation of a switching signal at its output. If, in the pauses between the information pulses modulated onto carriers, interferences occur in the form of more than four interfering pulses within 0.1 msec given an auxiliary signal TS of, for example, 32 kHz, then the interfering pulses are also demodulated. This does not have an interfering effect as long as the demodulated interfering impulse does not last any longer than the time span given by the quotient 6:frequency of the auxiliary signal TS. If the frequency of the auxiliary signal employed is the clock pulse, i.e. the frequency of the carrier for the signal to be demodulated, is 32 kHz, then the time span defined by the given quotient is approximately 0.2 msec.

Further improvements can be obtained when the number of the bistable flip-flops in the two demodulators is enlarged in accordance with an arrangement of FIG. 2. This means that the flip-flops FF2 or FF4 are connected to the clock pulse input T of a respective further flip-flop cell connected at the output side, which then in turn is connected in an analogous manner as the flip-flop cells FF2 or FF4 in accordance with FIG. 1, whereas the output circuit of FF2 and FF4 is adapted to the output circuit of FF1 or FF3. The NAND-gates NAND2 or NAND4 then respectively exhibit three logic inputs which are respectively connected to one of the three flip-flop cells belonging to the first demodulator or to respectively one of the three flip-flop cells belonging to the second demodulator by means of the Q-output in a manner analogous to FIG. 2. Additional advantages with respect to freedom from interference and distortion is obtained with this technique.

FIG. 3 illustrates the impulse time behavior of the signals, essential for the operation of the arrangement, in the form of four impulse trains. The first impulse train ZDS represents the signal to be demodulated as it is present at the reset inputs R of FF1 and FF2. The resting state of the arrangement corresponds with the level "L" and the time span referenced "U" amounts to 1.024 msec. In the time span without an impulse, a group SIG of interfering impulses occurs. The second impulse train represents the auxiliary signal TS which is connected to the pulse input of flip-flop FF1 and whose frequency is to at least approximately correspond with the carrier frequency of the signal ZDS to be demodulated.

The third impulse train VS represents the demodulated signal as it is output by the flip-flop cell FF2. It is still somewhat distorted. A completely corrected or equalized signal ES is then obtained by the effect of the flip-flop cells FF3 and FF4 at the outlet side.

If the group SIG of interfering impulses contains not more than four individual impulses relative to a minimum time span, this group is suppressed by the effect of the provided circuit. Otherwise, a demodulated interfering signal appears which represents a demodulated interference DSO without correction in case of impulse train VS, and represents a demodulated interference DSM with correction in the case of impulse group ES.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A digital demodulator comprising: first and second flip-flops and first and second NAND gates; an auxiliary signal corresponding with a carrier frequency of a signal to be demodulated being connected to a pulse input of the first bistable flip-flop via a first logic input of the first NAND gate; a pulse output of the first flip-flop being connected to a first logic input of the second NAND gate and also to a pulse input of the second bistable flip-flop; a pulse output of the second bistable flip-flop being connected to a second logic input of the second NAND gate; a logic output of the second NAND gate being connected to a second logic input of the first NAND gate; a demodulated signal being present at the pulse output of the second bistable flip-flop; and the signal to be demodulated being connected to reset inputs of the first and second bistable flip-flops.

2. A device according to claim 1, characterized in that the second flip-flop has two pulse outputs having the demodulated signal thereon, one of which connects the demodulated signal to a reset input of each of third and fourth bistable flip-flops; the signal to be demodulated being connected to a first logic input of a third NAND gate; a logic output of the third NAND gate being connected to a pulse input of the third bistable flip-flop; a pulse output of the third bistable flip-flop being connected to a first logic input of a fourth NAND gate and also to a pulse input of the fourth bistable flip-flop; a second logic input of the fourth NAND gate being connected to a first pulse output of the fourth bistable flip-flop; a logic output of the fourth NAND gate being connected to a second logic input of the third NAND gate; and a second pulse output of the fourth bistable flip-flop having the demodulated signal thereon.

3. A device according to claim 1 wherein each of the first and second flip-flops comprise a JK flip-flop cell having a reset input and whose J, K inputs are not employed.

4. A device according to claim 1 wherein the signal to be demodulated connects to the reset inputs of the first and second flip-flops through an inverter.

5. A device according to claim 1 wherein the first and second NAND gates and first and second flip-flops are provided on a semiconductor base.

6. A modification of a device according to claim 2 wherein the second NAND gate has n logic inputs and the fourth NAND gate has m logic inputs; a first group of n bistable flip-flops including the first and second flip-flops; pulse outputs of the first group of flip-flops each respectively connecting to a corresponding logic input of the second NAND gate; a second group of m bistable flip-flops including the third and fourth bistable flip-flops; pulse outputs of the second group of flip-flops each respectively connecting to a corresponding logic input of the fourth NAND gate; the bistable flip-flops of the first group forming a divider chain by means of connecting their pulse outputs to a pulse input of a respectively following flip-flop; the bistable flip-flops of the second group also forming a second divider chain; and reset inputs of the flip-flops of the first divider chain being loaded by the signal to be demodulated, and reset inputs of flip-flops of the second divider chain being simultaneously loaded by a pulse signal output of the last flip-flop of the first divider chain; and a demodulated signal being provided at a last bistable flip-flop of the second divider chain.

7. A digital demodulator, comprising:
first and second flip-flops and first and second NAND gates;
a reset input means of each flip-flop for connection to a signal to be demodulated;
a first logic input means of the first NAND gate for connection to an auxiliary signal;
a logic output means of the second flip-flop for providing a demodulated signal;
a logic output of the first NAND gate connecting to a pulse input of the first flip-flop;
a pulse output of the first flip-flop connecting to a first logic input of the second NAND gate and a pulse input of the second flip-flop;
a pulse output of the second flip-flop connecting to a second logic input of the second NAND gate; and
a logic output of the second NAND gate connecting to a second logic input of the first NAND gate.

* * * * *